(12) United States Patent
Squier et al.

(10) Patent No.: US 6,844,041 B2
(45) Date of Patent: Jan. 18, 2005

(54) CLEAR POLYMERIC LABEL INCLUDING DELAMINATABLE MASK LAYER

(75) Inventors: JoAnn H. Squier, Bloomfield, NY (US); Robert E. Touhsaent, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 10/330,510

(22) Filed: Dec. 27, 2002

(65) Prior Publication Data

US 2004/0126529 A1 Jul. 1, 2004

(51) Int. Cl.$^7$ ............................................ B32B 27/32
(52) U.S. Cl. ..................... 428/40.1; 283/81; 283/101; 283/109; 428/41.3; 428/41.5; 428/41.9; 428/42.1; 428/353; 428/354; 428/355; 428/515; 428/520
(58) Field of Search ............................... 428/40.1, 41.3, 428/41.5, 41.9, 42.1, 353, 354, 355, 515, 520; 283/81, 101, 109

(56) References Cited

U.S. PATENT DOCUMENTS

| 6,306,242 | B1 | | 10/2001 | Dronzek |
| 6,322,883 | B1 | * | 11/2001 | Williams ................. 428/308.4 |
| 6,495,231 | B2 | * | 12/2002 | Benoit et al. ................. 428/46 |
| 2001/0035265 | A1 | | 11/2001 | Dronzek |
| 2002/0146520 | A1 | | 10/2002 | Squier et al. |
| 2003/0039775 | A1 | * | 2/2003 | Kong ......................... 428/34.9 |
| 2003/0102080 | A1 | * | 6/2003 | Mallik ........................ 156/325 |

* cited by examiner

*Primary Examiner*—Nasser Ahmad
(74) *Attorney, Agent, or Firm*—Rick F. James

(57) ABSTRACT

A clear polymeric label including a delaminatable mask layer is provided. The label includes a non-cavitated mask layer having a first side that is suitable for forming a cohesive bond with an adhesive, preferably a water-based adhesive. The cohesive bond between the first side of the mask layer and the adhesive is grater than the cohesive bond between the second side of the mask layer and its adjacent layer, whereby attempted removal of the label results in separation of the mask layer, which remains attached to the container, and masks the adhesive.

26 Claims, 1 Drawing Sheet

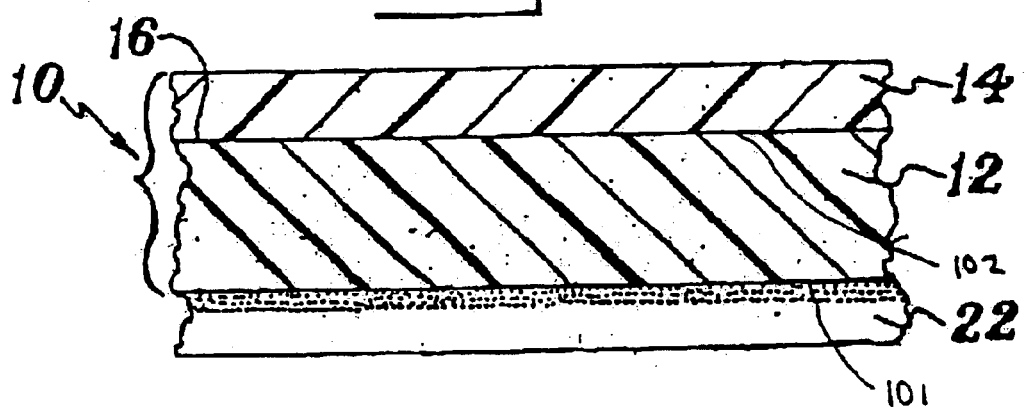
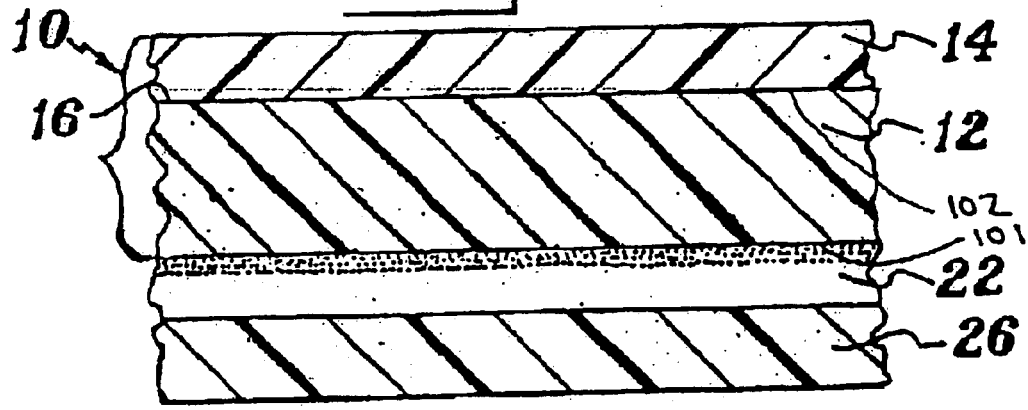

CLEAR POLYMERIC LABEL INCLUDING DELAMINATABLE MASK LAYER

BACKGROUND OF THE INVENTION

The present invention relates to a polymeric label and, more specifically, to a clear polymeric label that includes a delaminatable mask layer.

Polymeric labels are applied to a wide variety of bottles and containers in order to provide, for example, information about the product being sold or to display a trade name or logo. Polymeric labels can provide various advantageous characteristics not provided by paper labels, such as durability, strength, water resistance, curl resistance, abrasion resistance, gloss, transparency, and others. However, the use of polymeric labels poses various challenges.

For example, the unique characteristics of polymeric labels can make them unsuitable for conventional manufacturing techniques. The application of paper labels to glass and plastic containers using water-based adhesives is still one of the most prevalent labeling techniques presently used. Consequently, there are many existing machines that have been installed for this type of labeling technique. These cut label techniques using water-based adhesives work well with paper based labels applied to a glass, plastic or metal substrate because the wet adhesive wicks into the paper label which breathes. This release of the adhesive moisture through the paper labels allows the adhesive to fully dry.

This technique does not work well, however, on polymeric labels because the polymeric label does not permit the moisture from the adhesive to wick through. This can make the polymeric labels prone to "swimming" or moving from the desired label location during down stream processing. The trapping of moisture in the glue can also cause the glue to remain somewhat tacky. Thus, if the polymeric label should be removed, for example, by a consumer, the consumer may come into contact with the tacky glue.

U.S. Pat. No. 6,306,242 issued to Dronzek attempts to address this problem by applying a hydrophilic layer to the polymeric layer in order to absorb a portion of the water from the water-based adhesive. However, hydrophilic coatings or a coextruded hydrophilic layer tends to absorb water from the atmosphere in humid conditions thereby hindering the ability of the hydrophilic layer to bond with the adhesive layer. In addition, the hydrophilic layer can lose water to the atmosphere in dry conditions. This gain and loss of moisture can cause the label to curl thereby hindering label application.

The desire to use water-based adhesives with clear polymeric labels poses additional problems. For example, coatings (such as the mentioned hydrophilic coatings) can increase the opacity or haze of the label. In addition, the adhesive itself, or the moisture released from the adhesive upon drying, can increase the haze of the label.

Accordingly, there is a need in the art for a clear polymeric label that can be used with water-based adhesives without a substantial increase in opacity. There is also a need in the art for a clear polymeric label that delaminates upon attempting removal of the label from a container, thereby leaving a mask layer over any adhesive that may remain tacky.

SUMMARY OF THE INVENTION

The present invention, which addresses the needs of the prior art, relates to a clear polymeric label that includes a clear polymeric core layer and a clear polymeric mask layer. The mask layer is a non-cavitated layer having a first side and a second side. The second side of the mask layer forms a cohesive bond with a layer immediately adjacent to the second side of the mask layer. The first side of the mask layer is suitable to be contacted with a water-based adhesive such that a cohesive bond forms between the first side of the mask layer and the adhesive. The bond formed between the second side of the mask layer and the layer immediately adjacent to it is less than the cohesive bond between the first side of the mask layer and the adhesive. Thus, when an attempt is made to remove the label, the mask layer will separate from the layer immediately adjacent to the second side of the mask layer and remain attached to the adhesive, thereby masking the adhesive.

In one embodiment, the layer immediately adjacent to the second side of the mask layer is the core layer. In another embodiment, the layer immediately adjacent to the second side of the mask layer is a tie layer. The tie layer can be located between and immediately adjacent to the core layer and mask layer. Such a tie layer may be necessary if the cohesive bond between the mask layer and core layer is so weak that they will not remain attached to each other.

The label can be formed by conventional label manufacturing techniques. In a preferred embodiment, the core layer and mask layer are coextruded. One example of a suitable mask/core combination is a core layer of propylene and a mask layer of poly(lactic acid).

The label of the invention can include additional layers. In one embodiment, the label includes a print-receiving skin layer. The print-receiving skin layer can be positioned on the opposite side of the label from the mask layer.

In another preferred embodiment, the mask layer is combined with the water-based adhesive in the absence of a hydrophilic layer.

As a result, the present invention provides a clear polymeric label that is capable of delaminating in order to mask the adhesive layer when the label is removed from a product.

BRIEF DESCRIPTION OF THE DRAWINGS

FIG. 1 is a cross-sectional view of a label according to an embodiment of the invention, which includes a core layer and mask layer, with an applied adhesive.

FIG. 2 is a cross-sectional view of a label according to an embodiment of the invention, including a core layer and mask layer as shown in FIG. 1, attached to a surface via the adhesive.

DETAILED DESCRIPTION OF THE INVENTION

It has been discovered herein that a clear polymeric label can be designed having at least two layers that have a low level of cohesion such that delamination between such layers occurs when the label is removed. More specifically, the label includes a mask layer that has a low level of cohesion to the core layer of such label whereby, when an attempt is made to remove the label from a container, the mask layer separates from the core layer (and, therefore, the rest of the label). This delamination can therefore be utilized to mask any adhesive that is not dry if the label is removed, for example, by a consumer.

U.S. application Ser. No. 2002/0146520 published on Oct. 10, 2002, which is incorporated herein in its entirety, discloses a label having a cavitated skin layer that can be delaminated from adjacent layers. Unlike a conventional polymeric layer, the cavitated polymer layer permits the movement of moisture from the adhesive, similar to the wicking action of a paper label, which enhances the ability of the underlying adhesive to dry.

However, the use of a cavitated polymeric skin layer can be problematic in a clear label. First, the cavitation of the skin layer itself will increase the overall haze of the label. Second, the moisture entering the cavitated layer can increase the haze of the label, thus reducing the transparency of the clear label. Accordingly, cavitated polymeric layers are not preferred in the invention set forth herein.

In a first aspect of the invention, a clear label is provided that uses cohesive failure in a layer of the label to mask any adhesive that is not fully dry when the label is removed or becomes separated from the surface to which the label is attached. In this way, a consumer of a product to which the label is affixed, for example, would not come into contact with wet adhesive if the label is removed.

A clear label 10 according to an embodiment of the present invention is shown in FIG. 1. A "clear" label is defined herein as being substantially transparent, e.g., having a haze less than 5% according to ASTM methods, preferably less than 2%. The label 10 includes a mask layer 12 having a first side 101 and a second side 102 and a core layer 14. The mask layer 12 and the core layer 14 are clear polymeric layers having a low level of cohesion for each other relative to the level of cohesion between an adhesive 22 and the first side 101 of the mask layer 12.

For example, the mask layer 12 can be polylactic acid (PLA) and the core layer 14 can be polypropylene or ethylene propylene copolymer. Suitable polypropylenes include standard film grade isotactic polypropylene or a high crystalline polypropylene. PLA has a low level of cohesion to the polypropylene relative to the level of cohesion of the PLA to the adhesive.

The label 10 can be formed using conventional methods for the manufacture of polymeric films. The mask layer 12 and core layer 14 may each have one or more layers. In a preferred embodiment, the mask layer 12 and core layer 14 are coextruded.

The label 10 may be any thickness suitable for labeling or packaging applications. Preferably, the label has a polymer gauge of from about 0.5 mils to about 8 mils, and a caliper gauge of from about 1 mil to about 16 mils. Polymeric gauge generally refers to a gauge obtained through measurement of yield units and assumes no voids, whereas caliper gauge is physically measured with a caliper. In one embodiment, the label 10 is uniaxially oriented. In another embodiment, the label 10 is biaxially oriented.

The mask layer 12 should have a level of cohesion for the adhesive 22 suitable for attaching the label 10 to a product. At a minimum, the mask layer 12 should have a higher cohesion for the adhesive 22 than for the core layer 14, even when the adhesive 22 has only reached a gel state and/or has not fully dried. Accordingly, when the adhesive 22 reaches a gel state or is at least partially dry, the cohesive bond between the adhesive 22 and the first side 1001 of the mask layer 12 is greater than the cohesive bond between the second side 102 of the mask layer 12 and the core layer 14. For example, the adhesive 22 may begin to dry around the edges of the label 10, but not the center. If this label becomes separated from the surface of a product to which the label is attached, the mask layer 12 would remain adhered to the surface via adhesive 22, thus preventing a user of the product from contacting any remaining wet adhesive 22.

The label 10 can be fixed to various products or containers for products, such as bottles, can, vials, cartons, sachets, pouches, etc. FIG. 2 shows the label 10 attached to the surface of a product 26 by the adhesive 22. The surface of the product 26 may be formed, for example, from glass, plastic, rubber, synthetic resins, ceramic or other solid porous or non-porous materials.

It is preferred that the adhesive 22 be clear. Examples of clear adhesives are water-based adhesives, including cold glues. Water-based adhesives are well known in the art for use in combination with traditional paper labels.

Cold glues generally consist of solid base materials in combination with water. Cold glues can be an aqueous solution of a natural or synthetic adhesive. Cold glues are widely used as an economical alternative to wrap around or pressure sensitive labels. Some cold glues are a colloidal suspension of various proteinaceous materials in water and can be derived by boiling animal hides, tendons, or bones which are high in collagen. Alternatively, a cold glue can be derived from vegetables (e.g. starch, dextrin). Some cold glues are based on synthetic materials or resins (e.g., PVA, EVA). Suitable cold glues include HB Fuller® WB 5020 (St. Paul, Minn.), National Starchy® Cycloflex 14-200A (Bridgewater, N.J.), AABBITT® 712-150 (Chicago, Ill.), Henkel® 10-7026, and Henkel® 7302 (Elgin, Ill.).

The adhesive 22 can be applied directly to the label 10 or can first be applied to the surface 26 to which the label will be attached. The label 10 can then be placed on the adhesive coated surface, thereby bringing the label and adhesive into contact with each other.

The amount of adhesive coverage can vary depending upon the adhesive properties that are desired. The label of the invention can be coated with the adhesive 22 over the entire surface of the label 10. Alternatively, the label 10 can be partially coated with the adhesive to provide sealability over a limited area of the label surface. If the adhesive 22 is to be applied to the surface 26 to which the label will be attached, i.e., the surface of the product, it is preferred that the surface area of the product covered by the adhesive not be greater than the surface area of the label 10.

The label 10 can include other layers in addition to the mask layer 12 and the core layer 14. For example, the label may also include a print-receiving skin layer (not shown). The print-receiving skin layer can be positioned, for example, on the opposite side of the label 10 from the mask layer 12 as shown in Example 1. The print-receiving skin layer may be formed, for example from a polyolefin, such as, polypropylene, polyethylene, polybutylene or a polyolefinic copolymer or terpolymer.

The print-receiving skin layer may be surface treated by various techniques including, for example, flame treatment, corona treatment, plasma treatment or metalizing. The print-receiving skin layer can also be coated with a suitable primer coating, e.g., polyvinylidene chloride (PVdC) or an acrylic coating, which may be used to provide advantages such as enhanced gloss and enhanced compatibility with manufacturing processes and machinery. Priming the skin layer can also make the label more receptive to printing. Metalizing may be accomplished using various suitable metals as known in the art, for example, aluminum.

The print-receiving skin layer may include one or more anti-block agents to prevent "grabbing" of the label on the machine surfaces and one or more slip agents to provide better slip on heated metal surfaces, thus enhancing machining properties of the label. Examples of anti-block agents include coated silica, uncoated silica and crosslinked silicone. Examples of slip agents known in the art include silicone oils.

One or more additives may be optionally added to at least one of the layers of the label. Additives may be selected from any class of additives, including for example, antistatic agents, antioxidants, anti-condensing agents, slip agents, colored dyes, pigments, fillers, foaming agents, flame retardants, photodegradable agents, UV sensitizers or UV blocking agents, crosslinking agents, silicon compounds (e.g. SiO2) and anti-block agents to name but a few of the many known additives.

The label of the present invention may also include tie layers, as are known in the art. A tie layer may consist of one or more layers. For example, a tie layer (not shown) may be used to attach the mask layer 12 and core layer 14 having low cohesion for each other. If the level of cohesion between the mask layer 12 and the core layer 14 are such that they will not bind to each other, a tie layer may be necessary. However, when such a tie layer is used, the level of cohesiveness between the tie layer and the second side 102 of the mask layer 12 should be less than the cohesiveness between the first side 101 of the mask layer 12 and the adhesive 22, such that delamination occurs when the label 10 is removed from the surface 26. Upon delamination, the tie layer will stay bound to the core layer 14 and release from the mask layer 12. Other tie layers may be used, for example, between the core layer 14 and a print-receiving skin layer.

The following examples are provided to assist in a further understanding of the invention. The particular materials and conditions employed are intended to be further illustrative of the invention and are not limiting upon the reasonable scope thereof.

EXAMPLE 1

Five test labels were produced by coextruding the various layers using commercially obtainable resins and conventional polymeric label manufacturing techniques. The total thickness of each of the five test labels was about 2 mils.

All of the five test labels had the same basic structure set forth below.

| Approx. % of | Structure |
|---|---|
| 2% | Print Receiving skin layer - Fina 8573 |
| 5% | Tie layer - ExxonMobil EP 4712 |
| 80–82% | Core layer - ExxonMobil EP 4712 |
| 9% | Tie layer - Admer ® 1179 |
| 2–4% | Mask layer - variable |

As indicated above, the mask layer was variable. For Label #1, Fina 8573 (Atofina, Philadelphia, Pa.), an ethylene polypropylene copolymer, was used as the mask layer. Cargill-Dow poly (lactic acid) 4040 (Minnetonka, Minn.) was used as the mask layer for Label #2. Cargill-Dow poly (lactic acid) 4042D was used as the mask layer for Label #s 3–5.

In addition, additives were added to the mask layers of some of the labels. More specifically, 1 wvt % Ampacet Pearl 70 (Tarrytown, N.Y.) was added to the mask layer of Label #4. Ampacet Pearl 70 is a polypropylene resin containing 70% calcium carbonate. 2000 ppm Nippon Epostar® MA-1004 (Nippon Shokubai, Osaka, Japan) was added to Label #s 2 and 5.

Beer label size samples of film having a structure set forth above were glued to a wet glass beer bottle using a known cold glue adhesive, i.e., Henkelg® 7302. The cold label water based glue was applied to a glass plate using a Meyer drawdown rod. The cut labels were set on the adhesive and then pulled off the adhesive and applied to a wet beer glass bottle. The label was smoothed onto the glass to insure label contact with the glue and glass.

The label was then tested for the level of initial adhesion or "tack." The tack level was tested by applying a light tactile pressure to the label to see if it will slide on the bottle. No label movement, the best performance, was given a 5. The ratings go down to 1, which means the label essentially slides off the bottle. A rating of three or higher is acceptable for initial tack, and as the glue dries, improvement to 5 is expected. The level of tack was also tested after 24 and 48 hours.

The samples were also tested for delamination after 24 and 48 hours. The level of delamination, also called "tear," was tested by determining the amount of cohesive failure of the mask layer from label, with the mask layer sticking to bottle. This was done by peeling a corner back on the label and removing the label. The percentage of the mask layer remaining glued to the bottle was then measured. Greater than 50% of the mask layer remaining glued to the bottle was considered good delamination.

The results of the test are set forth below in Table 1.

TABLE 1

| Label # | Mask layer | Adhesive Type | Initial Tack-up | 24 hours Tack-up/De-lamination | 48 hours Tack-up/De-lamination |
|---|---|---|---|---|---|
| 1 | 8573 | Henkel 7302 | 4 | 5/0% | 5/0% |
| 2 | PLA 4040 + MA 1004 | Henkel 7302 | 4 | 5/90 | 5/100 |
| 3 | 4042D | Henkel 7302 | 4 | 5/100 | 5/100 |
| 4 | 4042D + 1% Pearl 70 | Henkel 7302 | 4 | 5/100 | 5/100 |
| 5 | 4042D + MA 1004 | Henkel 7302 | 4 | 5/100 | 5/100 |

Best 5 = no label movement
3 = some label movement
Failure 1 = no label adhesion All of the labels showed good initial tack up with a rating of 4. Tack-proved up improved with all of the labels to a rating of 5 (no label movement) after 24 and 48 hours.

With regard to delamination, Label 1 demonstrated 0% delamination. A low level of delamination was expected because the mask layer was an ethylene propylene copolymer that has a relatively high cohesion for the Admer® 1179 (Mitsui Petrochemical Industries Ltd., Tokyo, Japan) tie layer, which is a maleic anhydride film. Labels 2–5, on the other hand, have a poly (lactic acid) mask layer, which has a lower level of cohesion with the Admer® 1179 tie layer and a greater level of cohesion with the adhesive. Accordingly, label 2 shows 90% and labels 3–5 show 100% delamination.

What is claimed is:

1. A clear polymeric label, comprising:
a clear polymeric core layer; and
a clear no-cavitated mask layer having a first side and second side, said second side forming a cohesive bond with a layer immediately adjacent to said second side, and said first side being suitable to be contacted with a water-based adhesive such that a cohesive bond can form between the first side of the mask layer and the adhesive;
wherein the cohesive bond formed between the second side of the mask layer and the layer immediately adjacent to the second side of the mask layer is less than the cohesive bond between the first side of the mask layer and the adhesive;

the layer immediately adjacent to the second side of the mask layer is said clear polymeric core layer; and said clear polymeric core layer consists of a propylene-containing polymer, optionally, one or more additives, and wherein said mask layer comprises poly(lactic acid).

2. The label of claim 1, wherein said core and mask layers are extruded.

3. The label of claim 1, fiber comprising a print-receiving skin layer on the opposite side of the label from the mask layer.

4. The label of claim 1, wherein said mask layer is combined with said water-based adhesive in the absence of a hydrophilic layer.

5. The label of claim 1, wherein said core and mask layers are biaxially oriented.

6. The label of claim 1, wherein said water-based adhesive is a cold glue.

7. A clear polymeric label, comprising:

a clear polymeric core layer; and a clear non-cavitated mask layer having a first side and second side, said second side forming a cohesive bond with a layer immediately adjacent to said second side, and said first side being suitable to be contacted with a water-based adhesive such that a cohesive bond can form between the first side of the mask layer and the adhesive;

wherein the cohesive bond formed between the second side of the mask layer and the layer immediately adjacent to the second side of the mask layer is less than the cohesive bond between the first side of the mask layer and the adhesive;

the layer immediately adjacent to the second side of the mask layer is a tie layer having a first side and a second side;

the first side of said tie layer is adjacent to the second side of the mask layer and the second side of the tie layer is adjacent to said clear polymeric core layer;

said clear polymeric core layer consists of a propylene-containing polymer and, optionally, one or more additives, and wherein said mask layer comprises poly (lactic acid).

8. The label of claim 7, wherein said tie layer consists of more than one layer.

9. The label of claim 7, wherein said core, mask and tie layer are coextruded.

10. The label of claim 7, further comprising a print-receiving skin layer on the opposite side of the label from the mask layer.

11. The label of claim 7, wherein said mask layer is combined with said water-based adhesive in the absence of a hydrophilic layer.

12. The label of claim 7, wherein said core, tie and mask layers are biaxially oriented.

13. The label of claim 7, wherein said water-based adhesive is a cold glue.

14. A clear polymeric label, comprising:

a clear polymeric core layer;

a clear non-cavitated mask layer having a first side and second side, said second side forming a cohesive bond with a layer immediately adjacent to said second side; and a cold-glue adhesive on said first side of the clear non-cavitated mask layer, such that a cohesive bond is formed between said first side of the mask layer and the cold-glue adhesive;

wherein the cohesive bond formed between the second side of the mask layer and the layer immediately adjacent to the second side of the mask layer is less than the cohesive bond between the first side of the mask layer and the adhesive;

the layer immediately adjacent to the second side of the mask layer is said clear polymeric core layer, and wherein said mask layer comprises poly(lactic acid).

15. The label of claim 14, wherein said core and mask layers are coextruded.

16. The label of claim 14, wherein said core layer comprises a propylene-containing polymer.

17. The label of claim 14, further comprising a print-receiving skin layer on the opposite side of the label from the mask layer.

18. The label of claim 14, wherein said mask layer is combined with said water-based adhesive in the absence of a hydrophilic layer.

19. The label of claim 14, wherein said core and mask layers are biaxially oriented.

20. A clear polymeric label, comprising:

a clear polymeric core layer;

a clear non-cavitated mask layer having a first side and second side, said second side forming a cohesive bond with a layer immediately adjacent to said second side; and a cold-glue adhesive on said first side of the clear non cavitated mask layer, such that a cohesive bond is formed between said first side of the mask layer and the cold-glue adhesive;

wherein the cohesive bond formed between the second side of the mask layer and the layer immediately adjacent to the second side of the mask layer is less than the cohesive bond between the first side of the mask layer and the adhesive;

the layer immediately adjacent to the second side of the mask layer is a tie layer having a first side and a second side; and the first side of said tie layer is adjacent to the second side of th mask layer and the second side of the tie layer is adjacent to said clear polymeric core layer, and wherein said mask layer comprises poly(lactic acid).

21. The label of claim 20, wherein said tic layer consists of more than one layer.

22. The label of claim 20, wherein said core, mask and tie layers are coextruded.

23. The label of claim 20, wherein said core layer comprises a propylene-containing polymer.

24. The label of claim 20, further comprising a print-receiving skin layer on the opposite side of the label from the mask layer.

25. The label of claim 20, wherein said mask layer is combined with said water-based adhesive in the absence of a hydrophilic layer.

26. The label of claim 20, wherein said core, tie and mask layers are biaxially oriented.

* * * * *